United States Patent [19]
Kwon

[11] Patent Number: 5,754,163
[45] Date of Patent: May 19, 1998

[54] LIQUID CRYSTAL DISPLAY CONTROLLING APPARATUS

[75] Inventor: Byong-Hunn Kwon, Seoul, Rep. of Korea

[73] Assignee: LG Electronics Inc., Seoul, Rep. of Korea

[21] Appl. No.: 517,257

[22] Filed: Aug. 22, 1995

[30] Foreign Application Priority Data

Aug. 26, 1994 [KR] Rep. of Korea .................. 1994/21209

[51] Int. Cl.$^6$ .................................................. G09G 5/36
[52] U.S. Cl. .......................... 345/138; 345/137; 345/101
[58] Field of Search .................. 345/101, 136, 345/137, 138, 133, 428; 358/443, 448

[56] References Cited

U.S. PATENT DOCUMENTS

| | | | |
|---|---|---|---|
| 4,215,414 | 7/1980 | Huelsman | 345/138 |
| 4,611,232 | 9/1986 | Searby | 345/138 |

*Primary Examiner*—Steven Saras
*Assistant Examiner*—Xu-Ming Wu
*Attorney, Agent, or Firm*—John P. White; Cooper & Dunham LLP

[57] ABSTRACT

An LCD controlling apparatus wherein a horizontal filter and a vertical filter, which are digital filters, are independently constructed, which can improve a resolution by horizontally and vertically processing input image data to enhance the edge portion thereof, includes a main block for synthesizing or generating clocks necessary for internal operation and wholly controlling the internal operation, an image edge processing block for receiving image data from the main block and horizontally processing pixels of to-be-processed-image data and their horizontally adjacent pixels, receiving the horizontally processed image data and vertically processing pixels of to-be-processed image data and their vertically adjacent pixels, and an LCD interface block for rearranging pixels of image data horizontally and vertically processed in the image edge processing block to be suitable for pixel structure, linearly processing light transmission characteristics of the rearranged pixels and performing compensation according to temperature to then be divided into multiple block image data according to driving clocks of the respective pixels for output.

2 Claims, 5 Drawing Sheets

LIQUID CRYSTAL DISPLAY CONTROLLING APPARATUS

BACKGROUND OF THE INVENTION

The present invention relates to a liquid crystal display (LCD) controlling apparatus, and more particularly, to a LCD controlling apparatus wherein a horizontal filter and a vertical filter, which are digital filters, are independently constructed, which can improve a resolution by horizontally and vertically processing input image data to enhance the edge portion thereof.

Figure 1:
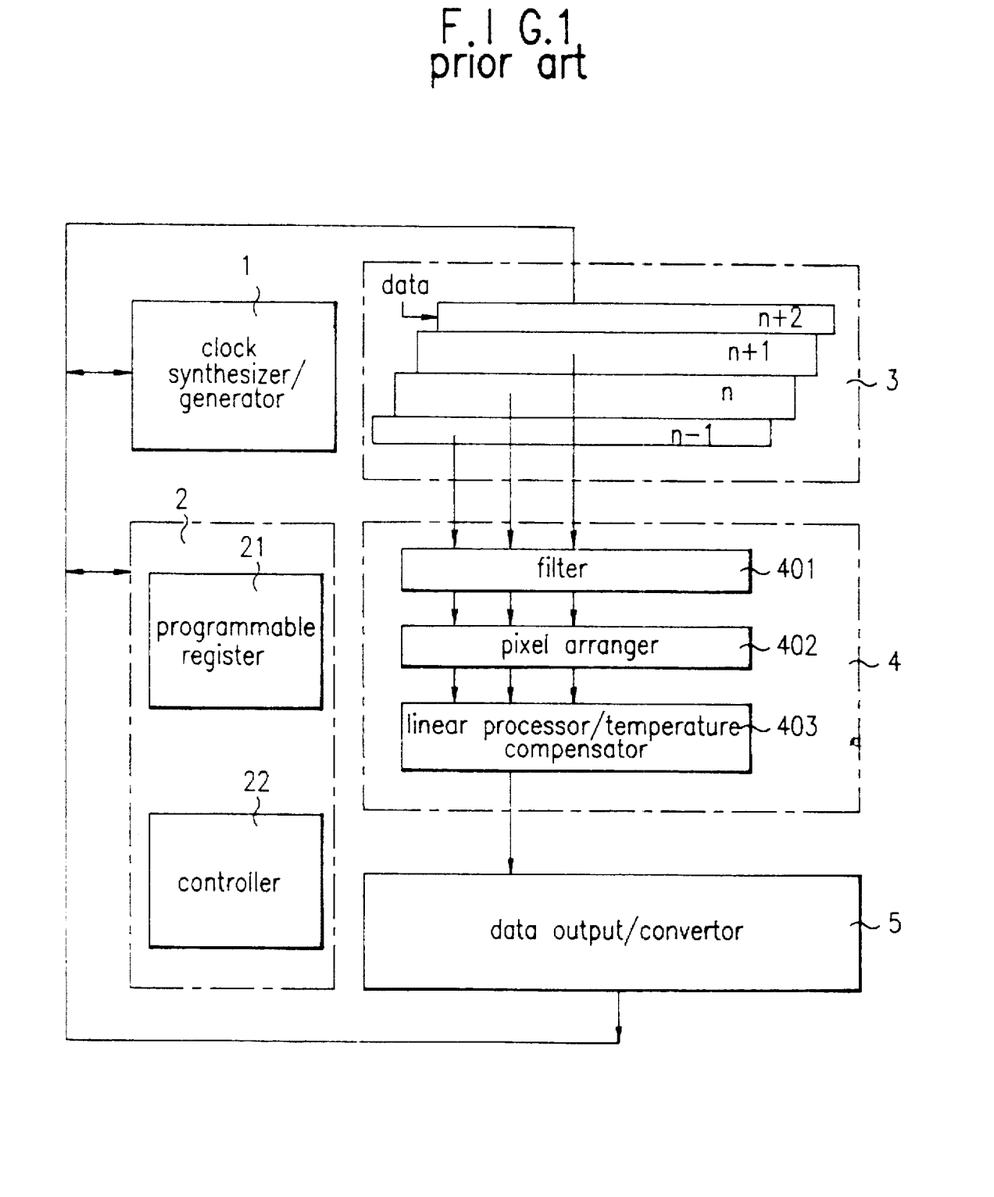
FIG. 1 is a block diagram showing the overall structure of a conventional LCD controlling apparatus.

FIG. 1 is a block diagram showing the overall structure of a conventional LCD controlling apparatus. As shown in FIG. 1, the conventional LCD controlling apparatus is constituted by a clock synthesizer & generator 1 for synthesizing and generating clocks necessary for internal operation, a main interface 2 for wholly controlling the internal operation by exchanging information with a central processing unit (not shown), a multi-line buffer 3 for sequentially storing input image data in four lines (n−1, n, n+1 and n+2) and sequentially outputting the data in an input sequence, a pixel data processor 4 for receiving current image data, previous image data and next image data from multi-line buffer 3 and processing the image data of each pixel, and a data output & converter 5 for dividing the image data processed in pixel data processor 4 into multiple block image data according to a driving clock of each pixel and outputting the divided data to a data driver (not shown). Main interface 2 includes a programmable register 21 for supporting the operation mode of pixel data processor 4 and a controller 22 for controlling a system.

Figure 2:
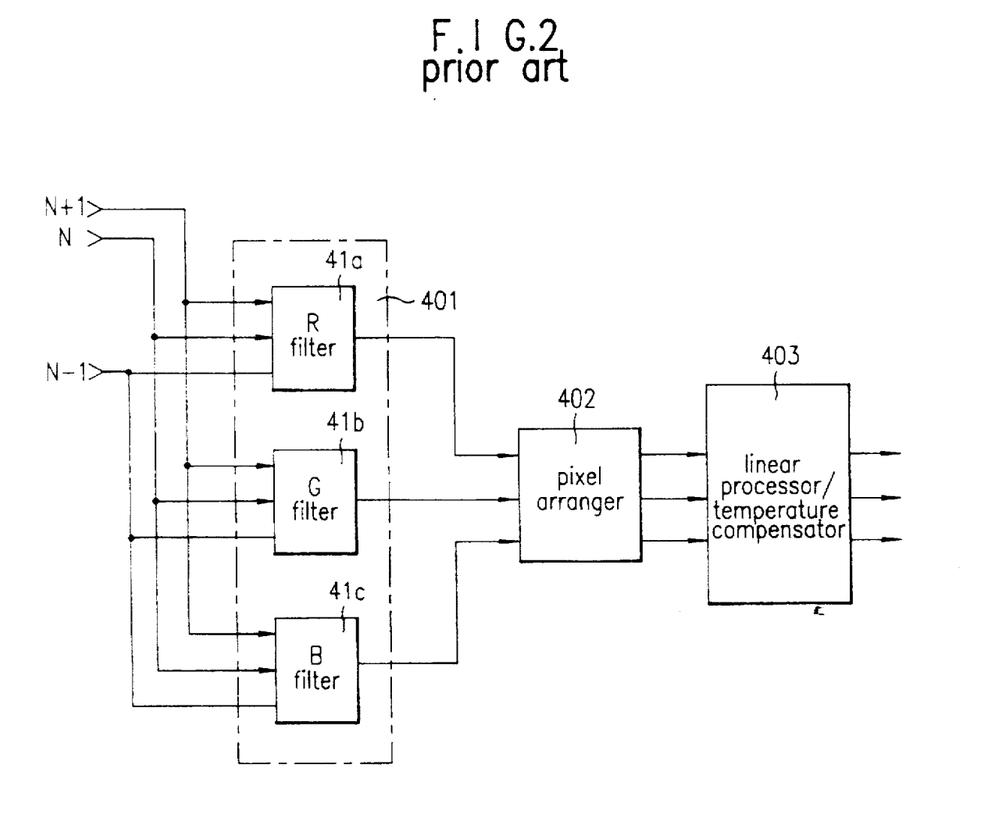
FIG. 2 is a detailed block diagram of a pixel data processor of the conventional LCD controlling apparatus shown in FIG. 1.

FIG. 2 is a detailed block diagram of a pixel data processor 4 shown in FIG. 1. As shown in FIG. 2, pixel data processor 4 is constituted by a filter 401 for receiving image data positioned in the current line (n), image data positioned in the previous line (n−1) and image data positioned in the next line (n+1) from multi-line buffer 3 and determining pixel values of the respective pixels by a mean value of the image data, a pixel arranger 402 for rearranging pixels according to the pixel value determined by filter 401, and a linear processor & temperature compensator 403 for linearly processing the transmission characteristics of the pixels rearranged according to output signals of pixel arranger 402 and performing compensation according to temperatures.

Filter 401 includes a R-filter 41a for filtering red components of input image data, a G-filter 41b for filtering green components of input image data, and a B-filter 41c for filtering blue components of input image data.

The operation of the conventional LCD controlling apparatus having the aforementioned configuration will be described with reference to FIGS. 1 and 2.

If clock synthesizer/generator 1 generates clocks necessary internal operation or synthesizes clocks generated in a CPU (not shown) to produce clocks necessary internal operation, controller 22 of main interface 2 controls the internal operation by exchanging information with CPU.

At this time, input image data are applied to multi-line buffer 3 having four lines (n−1, n, n+1 and n+2) as its inputs and then are sequentially stored therein. The stored data are output to pixel data processor 4 in an input sequence.

Assuming that the image data positioned in the current line (n) are designated by N, the image data positioned in the previous line (n−1) are designated by N−1, and the image data positioned in the next line (n+1) are designated by N+1, respectively, the respective image data are sequentially input to R-filter 41a, G-filter 41b and B-filter 41c of filter 401, as shown in FIG. 2.

R-filter 41a, G-filter 41b and B-filter 41c are digital lowpass filters and operate in a moving averaging method. If the respective pixels are rearranged to be suitable for LCD pixel structure by pixel arranger 402, these filters determines a pixel value generated by the average of the currently processed pixel and its adjacent pixels in order to reduce mutual aliasing of R-pixels, G-pixels and B-pixels. Here, the moving averaging method is a method of processing pixels by obtaining the mean value of adjacent pixels while a window is moved for operation. At this time, coefficients multiplied with the respective pixel values may be changed by programmable register 21 of main interface 2 and are prestored by a look up table (LUT) method.

In such a manner, if the pixel values determined in filter 401 are input to pixel arranger 402, pixel arranger 402 rearranges the respective pixels to be suitable for LCD pixel structure. Also, linear processor & temperature compensator 403 linearly processes the light transmission characteristics of the rearranged pixels and performs compensation according to temperature since the light transmission characteristics of LCD are nonlinear with respect to applied voltages.

The thus-processed image data are input to data output & converter 5 and are converted into multiple block image data according to driving clocks of the respective pixels to then be applied to data driver (not shown).

However, in the the conventional LCD controlling apparatus, before image data are rearranged in pixel arranger 402 to be suitable for LCD pixel structure, the image data are processed by filter 401, whose component filters 41a, 41b and 41c operate in a moving averaging method, so that edge components of image data are reduced or weakened, which makes it difficult to display clean screen.

Particularly, if signal source is high definition (HD) or the one (EWS) having a resolution higher than HD, the picture quality is considerably lowered.

SUMMARY OF THE INVENTION

To solve the above problems, it is an object to provide an LCD controlling apparatus by which edge components of image signal are not reduced or weakened, thereby obtaining clean screen.

Also, in order to prevent the lowering picture quality, it is another object to provide an LCD controlling apparatus by which vertical and horizontal filters are independently constructed so that a user selects a desired horizontal or vertical function, thereby improving picture quality of a specific direction.

To accomplish the above objects, there is provided a LCD controlling apparatus comprising: a main means for synthesizing or generating clocks necessary for internal operation and wholly controlling the internal operation; an image edge processing means for receiving image data from the main means and horizontally processing pixels of to-be-processed-image data and their horizontally adjacent pixels, receiving the horizontally processed image data and vertically processing pixels of to-be-processed image data and their vertically adjacent pixels; and an LCD interface means for rearranging pixels of image data horizontally and vertically processed in the image edge processing means to be suitable for pixel structure, linearly processing light transmission characteristics of the rearranged pixels and performing compensation according to temperature to then be divided into multiple block image data according to driving clocks of the respective pixels for output.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 3:
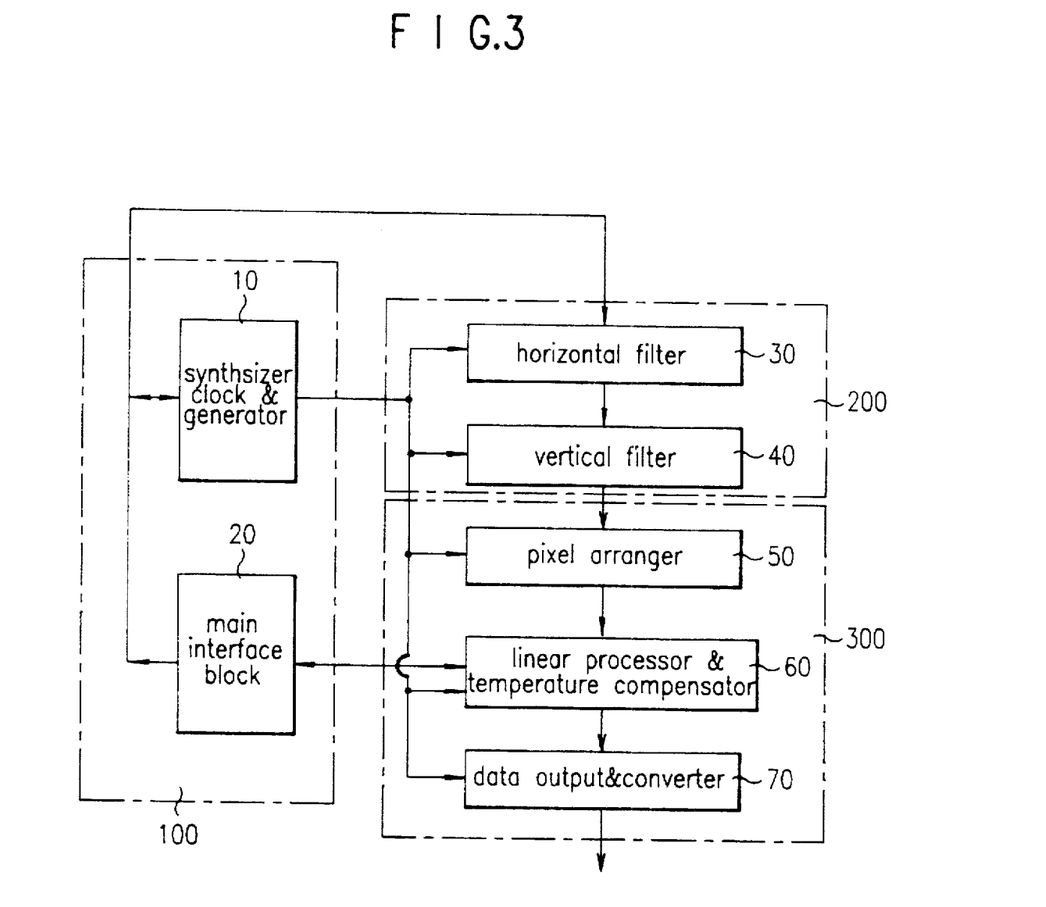
FIG. 3 is a block diagram showing the overall structure of an LCD controlling apparatus according to the present invention.

As shown in FIG. 3, an LCD controlling apparatus according to the present invention is constituted by a main block 100, an image edge processing block 200 and an LCD interface block 300.

Main block 100 synthesizes or generates clocks necessary for internal operation and wholly controls the internal operation.

Image edge processing block 200 receives image data from main block 100, horizontally processes pixels of currently processed image data and their horizontally adjacent pixels, receives the horizontally processed image data, and then vertically processes pixels of currently processed image data and their vertically adjacent pixels.

LCD interface block 300 rearranges the pixels processed horizontally and vertically in image edge processor 200 to be suitable for pixel structure, linearly processes the light transmission characteristics of the rearranged pixels and simultaneously performs compensation according to temperature, thereby dividing into multiple block image data according to driving clocks of the respective pixels and outputs the same.

To be more detail, main block 100 includes a clock synthesizer & generator 10 for generating clocks necessary for internal operation of LCD controlling apparatus or generating clocks necessary for operating LCD controlling apparatus by synthesizing clocks generated in CPU (not shown), and a main interface block 20 for exchanging signals with LCD interfacing block 300 and wholly controlling the internal operation.

Image edge processing block 200 includes a horizontal filter 30 for receiving image data from main interfacing block 20 of main block 100 and horizontally processing pixels of currently processed image data and their horizontally adjacent pixels, i.e., a previous pixel and a next pixel, and a vertical filter 40 for receiving the image data horizontally processed and output from horizontal filter 30 and vertically processing pixels of currently processed image data and their vertically adjacent pixels, i.e., a previous pixel and a next pixel.

LCD interfacing block 300 includes a pixel arranger 50 for rearranging the pixels processed in vertical filter 40 of image edge processor 200 to be suitable for pixel structure, a linear processor & temperature compensator 60 for linearly processing the light transmission characteristics of the pixels rearranged according to output signals of pixel arranger 50 and simultaneously performs compensation according to temperature, and data output & converter 70 for dividing the image data processed and output from linear processor & temperature compensator 60 into multiple block image data according to driving clocks of the respective pixels and outputting the same.

Figure 4:
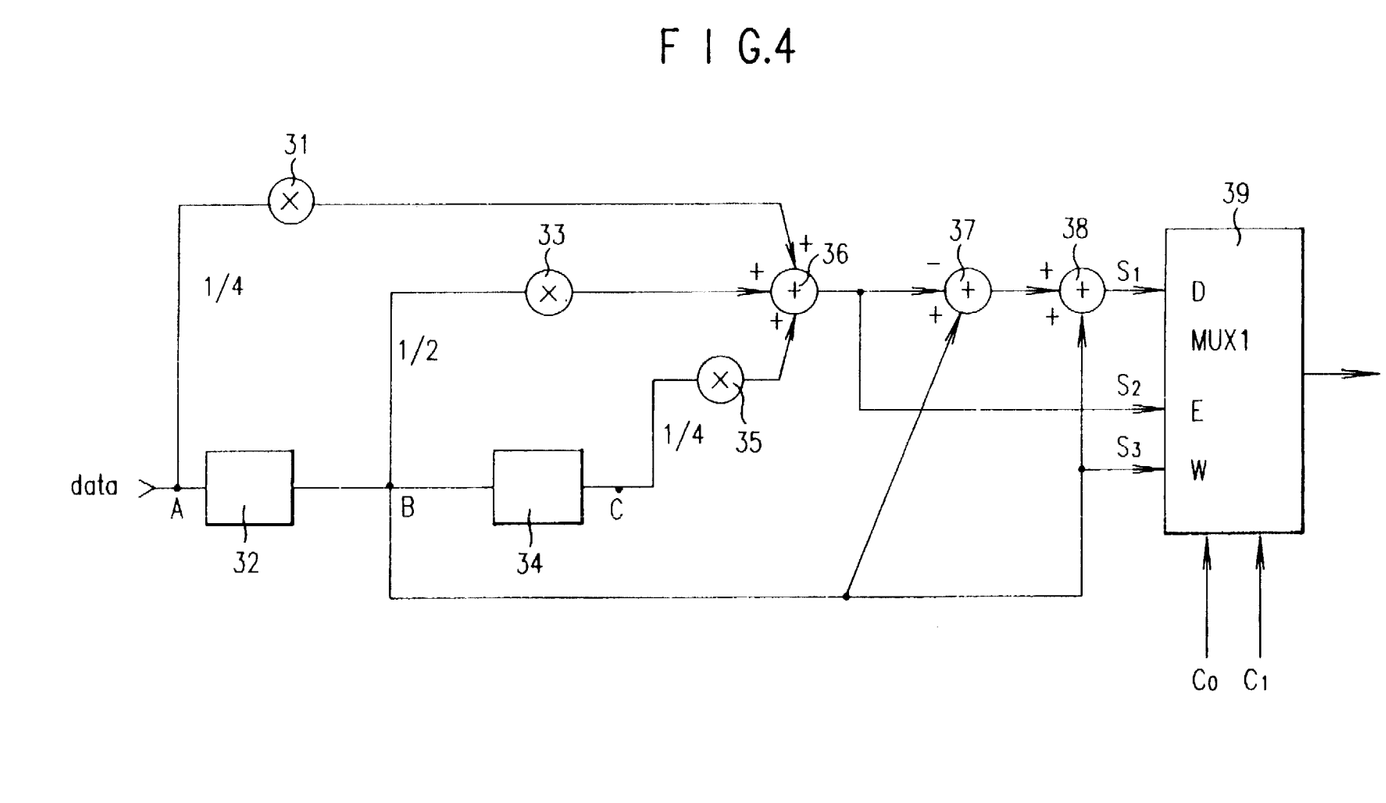
FIG. 4 is an internal circuit diagram of a horizontal filter of the LCD controlling apparatus according to the present invention.

FIG. 4 is an internal circuit diagram of horizontal filter 30 of image edge processing block 200 which is a part of the present invention. As shown in FIG. 4, horizontal filter 30 is constituted by a first multiplier 31 for multiplying a pixel value (A) of input image data by a quarter times, a first pixel delay 32 for delaying the pixel value (A) of image data by the interval corresponding to one pixel and outputting a pixel value (B), a second multiplier 33 for multiplying the pixel value (B) output from first pixel delay 32 by a half times, a second pixel delay 34 for delaying the pixel value (B) output from first pixel delay 32 by the interval corresponding to another pixel and outputting a pixel value (C), a third multiplier 35 for multiplying the pixel value (C) output from second pixel delay 34 by a quarter times, a first adder 36 for adding output signals of first, second and third multipliers 31, 33 and 35, a second adder 37 for adding an output signal of first adder 36 to an output signal (pixel value B) of first pixel delay 32, a third adder 38 for adding an output signal of second adder 37 to an output signal (pixel value B) of first pixel delay 32, and a first multiplexer (MUX1) 39 for selectively outputting one of a horizontal edge enhancing signal S1, a horizontally lowpass-filtered signal S2, and an unprocessed signal S3, which are output signals of third adder 38, first adder 36 and first pixel delay 32, according to an input state of control signals C0 and C1.

Figure 5:
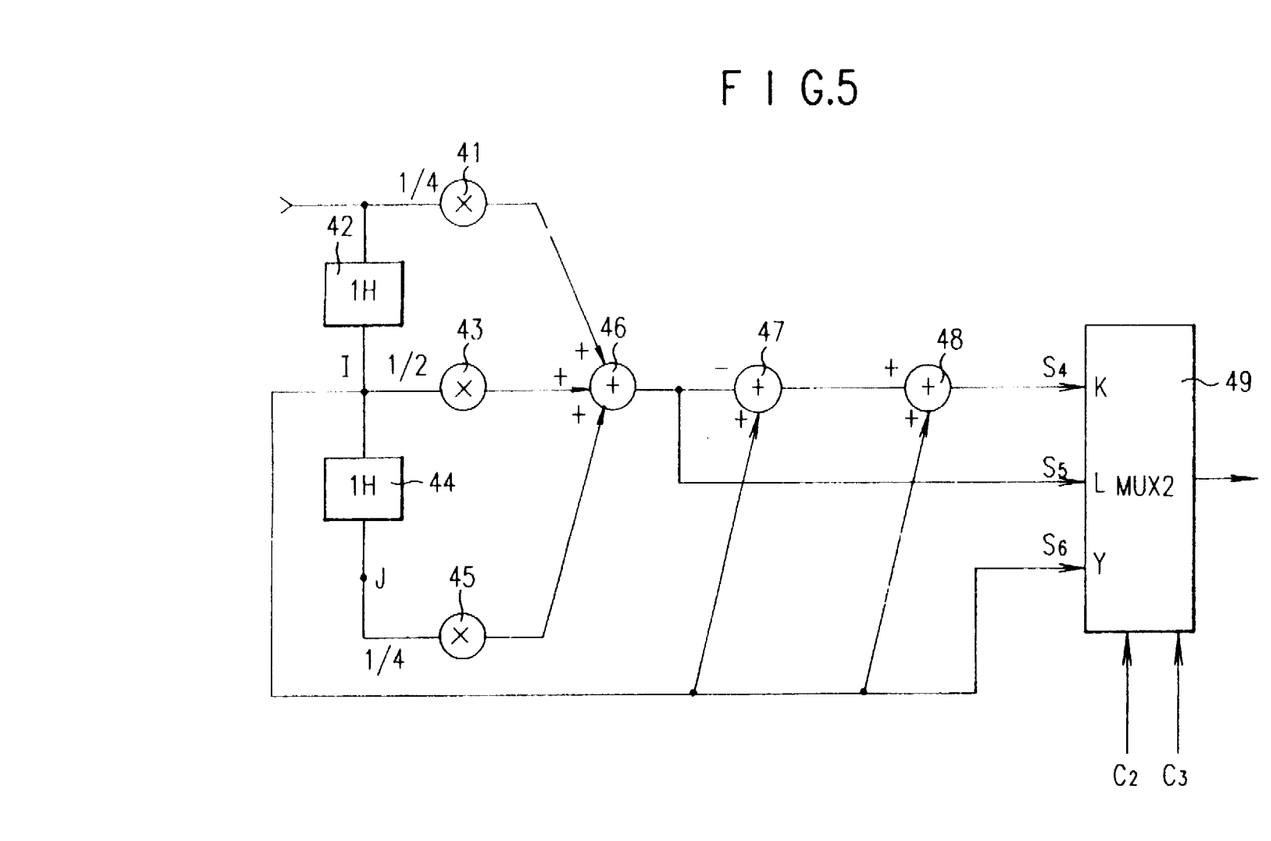
FIG. 5 is an internal circuit diagram of a vertical filter of the LCD controlling apparatus according to the present invention.

FIG. 5 is an internal circuit diagram of vertical filter 40 of image edge processing block 200 which is a part of the present invention. As shown in FIG. 4, vertical filter 40 is constituted by a fourth multiplier 41 for multiplying a pixel value (H) of image data horizontally processed and output from horizontal filter 30 by a quarter times, a first line delay 42 for delaying the pixel value (H) of image data by the interval corresponding to one line and outputting a pixel value (I), a fifth multiplier 43 for multiplying the pixel value (I) output from first line delay 42 by a half times, a second line delay 44 for delaying the pixel value (I) output from first line delay 42 by the interval corresponding to another line and outputting a pixel value (J), a sixth multiplier 45 for multiplying the pixel value (J) output from second line delay 44 by a quarter times, a fourth adder 46 for adding output signals of fourth, fifth and sixth multipliers 41, 43 and 45, a fifth adder 47 for adding an output signal of fourth adder 46 to an output signal (pixel value I) of first line delay 42, a sixth adder 48 for adding an output signal of fifth adder 47 to an output signal (pixel value I) of first line delay 42, and a second multiplexer (MUX2) 49 for selectively outputting one of a vertical edge enhancing signal S4, a vertically lowpass-filtered signal S5, and an unprocessed signal S6, which are output signals of sixth adder 48, fourth adder 46 and first line delay 42, according to an input state of control signals C2 and C3.

The operation and effect of the present invention having the aforementioned configuration will now be described with reference to FIGS. 3 through 5.

If clocks necessary for internal operation of LCD controlling apparatus are generated or clocks necessary for operating LCD controlling apparatus are generated by synthesizing clocks generated in CPU (not shown), main interface block 20 exchanges signals with LCD interfacing block 300 and wholly controls the internal operation.

At this time, if input image data are applied to horizontal filter 30, horizontal filter 30 horizontally processes pixels of currently processed image data and their horizontally adjacent pixels, i.e., a previous pixel and a next pixel.

Vertical filter 40 receives the image data horizontally processed and output from horizontal filter 30 and vertically processes pixels of currently processed image data and their vertically adjacent pixels, i.e., a pixel previously positioned from one scanning line and a pixel next thereto.

In this manner, if the respective pixels are horizontally and vertically processed by horizontal filter 30 and vertical filter 40, pixel arranger 50 rearranges the red (R), green (G) and blue (B) pixels to be suitable for the pixel structure of LCD.

Then, linear processor & temperature compensator 60 linearly processes the light transmission characteristics of the red (R), green (G) and blue (B) pixels rearranged in pixel arranger 50 since the light transmission characteristics of LCD are nonlinear for applied voltages. Simultaneously, linear processor & temperature compensator 60 performs compensation according to temperature.

Accordingly, data output & converter 70 outputs the input image data to data driver (not shown). At this time, the driving clocks of data driver are limited, i.e., about 15 MHz. Thus, in order to obtain data (XGA, EWS, HD) of high resolution image signal source, the input image data should be divided into several block image data and processed to be input to data driver.

Here, the operation of horizontal filter 30 and vertical filter 40 will be described with reference to FIGS. 4 and 5.

First, horizontal filter 30 will be described.

In FIG. 4, reference letter B represents a pixel value of currently to be image data, reference letter A represents a pixel value of image data input one sample interval later than pixel value B, and reference letter C represents a pixel value of image data input one sample interval earlier than pixel B. The pixel values of the image data are designated by C, B, and A, respectively in the following table, and the values of the pixels are 10, 16 and 16, respectively.

The following table shows an embodiment of input image data according to the present invention, where the respective pixel values are indicated by decimal numbers.

| 10 | 10    | 10    | 10    | 10    | 10 |
|----|-------|-------|-------|-------|----|
| 10 | 10    | 10(C) | 16(B) | 16(A) | 10 |
| 10 | 10(J) | 10    | 16    | 16    | 10 |
| 10 | 16(I) | 16    | 16    | 16    | 10 |
| 10 | 16(H) | 16    | 16    | 16    | 10 |
| 10 | 10    | 10    | 10    | 10    | 10 |

According to the table, first multiplier 31 multiplies the pixel value (A) of the image data by a quarter times. Second multiplier 33 multiplies the pixel value (B) by a half times. Third multiplier 35 multiplies the pixel value (C) output from second pixel delay 34 by a quarter times. Then, first adder 36 outputs 14.5 obtained by adding the outputs of first, second and third multipliers 31, 33 and 35.

The output value of first adder 36, 14.5, is a result of horizontally lowpass-filtering, and is applied to an input port E of first multiplexer 39.

Second adder 37 obtains the difference between the pixel value (B) of the currently processed pixel, i.e., 16, and the horizontally lowpass filtered value, i.e., 14.5. The thus-obtained value, 1.5, is added to the pixel value (B) of the original pixel by third adder 38 to then be applied to an input port D of first multiplexer (MUX1) 39. The input value 17.5 is a value which enhances the horizontal edge.

Also, the pixel value (B) of the currently processed pixel, i.e., 16, is unprocessed and is applied to an input port W of first multiplexer 39.

Accordingly, as shown in the following truth table, first multiplexer 39 selectively outputs one of a horizontal edge enhancing signal S1, a horizontally lowpass-filtered signal S2, and an unprocessed signal S3 according to control signals C0 and C1.

| C0 | C1 | Output of MUX1 |
|----|----|----|
| 0 | 0 | S1 |
| 0 | 1 | S2 |
| 1 | 0 | S3 |
| 1 | 1 | X |

If the control signals C0 and C1 are 0 and 0, first multiplexer (MUX1) 39 selects and outputs a horizontal edge enhancing signal S1 applied through its input port D. If the control signals C0 and C1 are 0 and 1, first multiplexer (MUX1) 39 selects and outputs a horizontally lowpass-filtered signal S2 applied through its input port E. Also, if the control signals C0 and C1 are 1 and 0, first multiplexer (MUX1) 39 selects and outputs an unprocessed signal S3 applied through its input port W. However, if the control signals C0 and C1 are 1 and 1, first multiplexer (MUX1) 39 outputs no signal among the three signals.

Next, vertical filter 40 will be described.

In FIG. 5, reference letter I represents a pixel value of image data currently to be processed line, reference letter H represents a pixel value of image data input one line interval later than pixel value I, and reference letter J represents a pixel value of image data input one line interval earlier than pixel B. The pixel values of the image data are designated by J, I, and H in the above table showing an embodiment of input image data according to the present invention, respectively, and the values of the pixels are 10, 16 and 16, respectively.

According to the above table, fourth multiplier 41 multiplies the pixel value (H) of the image data by a quarter times. Fifth multiplier 43 multiplies the pixel value (I) by a half times. Sixth multiplier 45 multiplies the pixel value (J) output from first line delay 44 by a quarter times and outputs the same. Then, fourth adder 46 adds the outputs of fourth, fifth and sixth multipliers 41, 43 and 45 and outputs a value of 14.5.

The thus-output value of fourth adder 46, 14.5, is a result of vertically lowpass-filtering with respect to pixel values H, I and J, and is applied to an input port L of second multiplexer 49.

Fifth adder 47 obtains the difference between the pixel value (I) of the currently processed pixel, i.e., 16, and the vertically lowpass filtered value, i.e., 14.5. The thus-obtained value, 1.5, is added to the pixel value (I) of the original pixel by sixth adder 48 to then be applied to an input port K of second multiplexer (MUX2) 49. The input value 17.5 is a value which enhances the vertical edge.

Also, the pixel value (I) of the currently processed pixel, i.e., 16, is unprocessed and is applied to an input port Y of second multiplexer 49.

Accordingly, as shown in the following truth table, second multiplexer 49 selectively outputs one of a vertical edge enhancing signal S4, a vertically lowpass-filtered signal S5, and an unprocessed signal S6 according to control signals C2 and C3.

| C2 | C3 | Output of MUX2 |
|----|----|----------------|
| 0  | 0  | S4             |
| 0  | 1  | S5             |
| 1  | 0  | S6             |
| 1  | 1  | X              |

If the control signals C2 and C3 are 0 and 0, second multiplexer (MUX2) 49 selects and outputs a vertical edge enhancing signal S4 applied through its input port K. If the control signals C2 and C3 are 0 and 1, second multiplexer (MUX2) 49 selects and outputs a vertically lowpass-filtered signal S5 applied through its input port L. Also, if the control signals C2 and C3 are 1 and 0, second multiplexer (MUX2) 49 selects and outputs an unprocessed signal S6 applied through its input port Y. However, if the control signals C2 and C3 are 1 and 1, second multiplexer (MUX2) 49 outputs no signal among the three signals.

As described above, according to the present invention, a horizontal filter and a vertical filter are independently constructed, so that a user can adequately select an edge enhancing function, a lowpass filtering function, or an unprocessing function, horizontally or vertically, thereby improving a picture quality of a specific direction. Also, the picture quality of a television receiver or a video cassette recorder as well as that of an LCD controlling apparatus can be improved by a digital processing method.

What is claimed is:

1. An LCD controlling apparatus comprising:
   a main means for synthesizing or generating clocks necessary for internal operation and wholly controlling the internal operation;
   an image edge processing means for receiving image data from said main means and horizontally processing pixels of to-be-processed-image data and their horizontally adjacent pixels, receiving the horizontally processed image data and vertically processing pixels of to-be-processed image data and their vertically adjacent pixels; and
   an LCD interface means for rearranging pixels of image data horizontally and vertically processed in said image edge processing means to be suitable for pixel structure, linearly processing light transmission characteristics of the rearranged pixels and performing compensation according to temperature to then be divided into multiple block image data according to driving clocks of the respective pixels for output;
   wherein said image edge processing means comprises:
   a horizontal filter for receiving image data from main means and horizontally processing pixels of currently processed image data and their horizontally adjacent pixels (a previous pixel and a next pixel); and
   a vertical filter for receiving the image data horizontally processed and output from said horizontal filter and vertically processing pixels of currently processed image data and their vertically adjacent pixels (a previous pixel and a next pixel); wherein said horizontal filter comprises:
   a first multiplier for multiplying a pixel value (A) of input image data by a quarter times;
   a first pixel delay for delaying said pixel value (A) of said image data by the interval corresponding to one pixel and outputting a pixel value (B);
   a second multiplier for multiplying said pixel value (B) output from said first pixel delay by a half times;
   a second pixel delay for delaying said pixel value (B) output from said first pixel delay by the interval corresponding to another pixel and outputting a pixel value (C);
   a third multiplier for multiplying said pixel value (C) output from said second pixel delay by a quarter times;
   a first adder for adding output signals of said first, second and third multipliers;
   a second adder for adding an output signal of said first adder to an output signal (pixel value B) of said first pixel delay;
   a third adder for adding an output signal of said second adder to an output signal (pixel value B) of said first pixel delay; and
   a first multiplexer for selectively outputting one of a horizontal edge enhancing signal, a horizontally lowpass-filtered signal, and an unprocessed signal, which are output signals of said third adder, said first adder and said first pixel delay, according to an input state of control signals.

2. An LCD controlling apparatus comprising:
   a main means for synthesizing or generating clocks necessary for internal operation and wholly controlling the internal operation;
   an image edge processing means for receiving image data from said main means and horizontally processing pixels of to-be-processed-image data and their horizontally adjacent pixels, receiving the horizontally processed image data and vertically processing pixels of to-be-processed image data and their vertically adjacent pixels; and
   an LCD interface means for rearranging pixels of image data horizontally and vertically processed in said image edge processing means to be suitable for pixel structure, linearly processing light transmission characteristics of the rearranged pixels and performing compensation according to temperature to then be divided into multiple block image data according to driving clocks of the respective pixels for output;
   wherein said image edge processing means comprises:
   a horizontal filter for receiving image data from main means and horizontally processing pixels of currently processed image data and their horizontally adjacent pixels (a previous pixel and a next pixel) and
   a vertical filter for receiving the image data horizontally processed and output from said horizontal filter and vertically processing pixels of currently processed image data and their vertically adjacent pixels (a previous pixel and a next pixel); wherein said vertical filter comprises:
   a fourth multiplier for multiplying a pixel value (H) of image data horizontally processed and output from said horizontal filter by a quarter times;
   a first line delay for delaying said pixel value (H) of said image data by the interval corresponding to one line and outputting a pixel value (I);
   a fifth multiplier for multiplying said pixel value (I) output from said first line delay by a half times;
   a second line delay for delaying said pixel value (I) output from said first line delay by the interval corresponding to another line and outputting a pixel value (J);
   a sixth multiplier for multiplying said pixel value (J) output from said second line delay by a quarter times;

a fourth adder for adding output signals of said fourth, fifth and sixth multipliers;

a fifth adder for adding an output signal of said fourth adder to an output signal (pixel value I) of said first line delay;

a sixth adder for adding an output signal of said fifth adder to an output signal (pixel value I) of said first line delay; and a second multiplexer for selectively outputting one of a vertical edge enhancing signal, a vertically lowpass-filtered signal, and an unprocessed signal, which are output signals of said sixth adder, said fourth adder and said first line delay, according to an input state of control signals.

* * * * *